Figure 1:
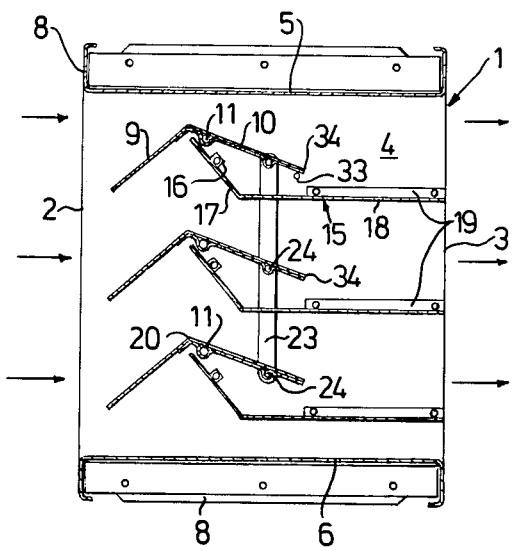

United States Patent [19]

Nilsson

[11] 4,064,905

[45] Dec. 27, 1977

[54] APPARATUS FOR MAINTAINING CONSTANT MASS FLOW

[75] Inventor: Allan Elvir Nilsson, Tomelilla, Sweden

[73] Assignee: Stifab AB, Jonkoping, Sweden

[21] Appl. No.: 679,058

[22] Filed: Apr. 21, 1976

[30] Foreign Application Priority Data

Apr. 29, 1975 Sweden .................................. 7504969

[51] Int. Cl.$^2$ ............................................. G05D 7/01
[52] U.S. Cl. ..................................... 137/499; 98/110; 137/512.1; 137/520
[58] Field of Search ..................... 137/499, 504, 512.1, 137/520, 521; 98/110

[56] References Cited

U.S. PATENT DOCUMENTS

| 16,055 | 11/1856 | Osgood | 137/521 X |
|---|---|---|---|
| 505,238 | 9/1893 | Smith | 137/520 X |
| 3,837,268 | 9/1974 | Alley | 137/521 X |

FOREIGN PATENT DOCUMENTS

| 1,308,322 | 1/1971 | United Kingdom | 137/499 |

Primary Examiner—Robert G. Nilson
Attorney, Agent, or Firm—Young & Thompson

[57] ABSTRACT

An air flow regulating apparatus comprising a regulator housing having an air inlet and an air outlet and an air passage extending from the inlet to the outlet. In the passage there is provided at least one movable damper blade attached to a shaft extending transversely to the flow direction in the air passage and having its ends pivotally journalled in the air passage side walls. One of the shaft ends extends through an opening in one of said side walls and has the form of a counterweight neck on the outside of the housing, there being attached to said neck an adjustable mass body system. The damper blade is angular in cross section and has a plane forward blade portion and a plane rear blade portion enclosing an obtuse angle with said forward blade portion. The passage air flow forces acting on the forward and rear portions of the blade produce a moment around the blade shaft which moment is counterbalanced by the torque applied to the counterweight neck by the mass body system, and an equilibrium position for the blade is thus brought about.

6 Claims, 4 Drawing Figures

APPARATUS FOR MAINTAINING CONSTANT MASS FLOW

The present invention relates to an apparatus intended for placing in the path of a fluid flow, e.g., an air-stream, to maintain a substantially constant mass flow in the flow path downstream of the apparatus independent of pressure alterations in the flow path upstream of the apparatus, said apparatus comprising a regulator housing with a fluid inlet to which the flow path upstream of the apparatus is connected, a fluid outlet to which the flow path downstream of the apparatus is connected and at least one throughput passage in the housing, extending from inlet to outlet, in said passage there being arranged at least one movable damper element operable from outside the housing, the adjustment of which causes alteration of the throughput cross-sectional area of the passage.

The fluid flow path in which the apparatus according to the invention is intended to be placed can, for example, consist of a flow duct incorporated in an air supply or exhaust system. The flow path can also be a duct or passage in a pneumatic conveying unit or the like.

The problem on which the invention is based consists primarily in providing a new type of constant flow apparatus wherewith a substantially constant mass flow can be maintained downstream of the apparatus independent of the pressure prevailing in the fluid flow path upstream of the device. The apparatus for constant flow according to the invention shall hereby have the capacity of keeping the downstream pressure substantially constant within at least a limited variation range for the pressure upstream of the apparatus in the flow path. An increased or decreased flow resistance in the flow path downstream of the apparatus shall also cause such resetting of the apparatus that the desired flow conditions are at least substantially maintained.

The said purpose is achieved according to the invention by the apparatus being characterized in that each damper element consists of a damper blade, angularly shaped in cross section, with a substantially planar forward blade portion and a substantially planar rear blade portion connected thereto, which forms an obtuse angle to the forward blade portion, said damper blade being carried by and attached to a damper shaft extending across the passage and pivotally mounted in the housing, whereby the throughput cross-sectional area is determined primarily by a gap between the rear blade portion and a first fixed wall portion in the passage, and secondarily by an intermediate space between the forward blade portion and a second fixed or movable wall portion in the passage and that the setting position of the damper blade in the passage is determined by the torque equilibrium about the damper shaft resulting from the fluid forces which the fluid mass flow generate respectively on the forward and the rear blade portion, and a torque wherewith the damper shaft is actuated by an adjustable counteracting mass unit or mass body system carried by and acting on a counterweight neck projecting outwardly from the outside of the housing.

The apparatus according to the invention can thus be provided in its regulator housing with one, two or more damper blades for regulating the cross-sectional throughput area of the passage. The forward portions of the damper blades are those which the fluid flowing through the regulator housing inlet first meets on its way to the regulator housing outlet.

The regulator housing has to advantage the shape of a box or boxlike structure whereat the throughput passage for the flow through the housing has a substantially rectangular or quadratic outside configuration. The flow inlet of the housing suitably occupies the major portion of the front end of the housing and the fluid outlet similarly occupies the major portion of the rear end of the housing. To achieve a synchronous movement of the damper blades, these may be connected together by a connecting link which, according as the number of blades, is hingedly connected at two or more points to the blades. The connecting link is suitably arranged transversely to the direction of flow in the regulator housing and suitably placed adjacent one side of the passage.

For an embodiment with two or more damper blades it is suitable for each blade to be in coaction with a baffle plate fastened crosswise in the passage which plate provides each damper blade with its own throughput passage in the housing. To advantage the baffle plate extends sideways between the parallel side walls of the housing, and in a longitudinal section in the flow direction through the housing has an angular shape such that it extends with a planar forward portion from the area of the damper blade shaft down to a line parallel with this shaft below and downstream of the shaft from which line the plate continues with a planar rear portion parallel with the top and bottom walls of the passage out towards the fluid outlet of the housing.

When the apparatus according to the invention has at least three identically shaped damper blades in the housing, said blades being connected together by a common connecting link arranged transversely in the passage, the gap for the upper damper blade is defined by the upper wall of the passage, and the rear blade portion of the blade, the gaps of the remaining damper blades (lying beneath) being defined by the lower side of the rear portions of the baffle plate associated with the damper blade lying above, and the respective damper blade rear blade portion, the opening of the lowest damper blade being defined by the bottom wall of the passage and the front edge of the forward portion of the blade, while the openings of the remaining damper blades (lying above) are defined by the front edge of the forward portion of the respective blade and the damper blade below.

In such an embodiment each damper blade will thus regulate the flow through the downstream portion of its throughput passage by means of its rear blade portion, while the front portion of the blade affects the inflow of fluid on the upper side of the damper blade (next in underlying order) in the appratus. Trails which have been carried out have shown that the angle between the forward and rear blade portion of the damper blade should be of the order of magnitude 100°–140°. An angle of 120° could be preferable in many cases. To provide simple counterbalancing of the damper blades it is in many case suitable that the blade shaft is situated adjacent the forward part of the blade rear portion.

In an embodiment with at least two damper blades, it is suitable that the shaft of one damper blade projects out on the outside of the housing with one of its journalled ends extended into a neck, forming the shaft for the counterweight of the apparatus. The mass body system which acts on said counterweight neck comprises an arm projecting at right angles to the shaft, and which may be fixed in the desired radial direction relative to the shaft, on the arm there being a counterweight which may be locked to it in different positions. Because of the adjustability of the mass body system, i.e. the possibility of adjusting the direction of the arm relative to the shaft, and/or the position of the counterweight on the arm, desired alterations of the magnitude of the mass flow and the downstream pressure is enabled. With the selected design of the mass body system, the apparatus can also be used completely independent of any special direction of the flow path, i.e. independent of the location of the regulator housing.

It is suitable for the movement range of the damper blades to be limited by some form of stopping means. These stopping means can for example take the shape of a set screw attached to the housing for engaging at least one of the damper blades, and a second set screw or a stop for the same or some other damper blade in the apparatus.

The invention will now be explained and described in detail while referring to an embodiment shown on the appended drawings.

Figure 2:
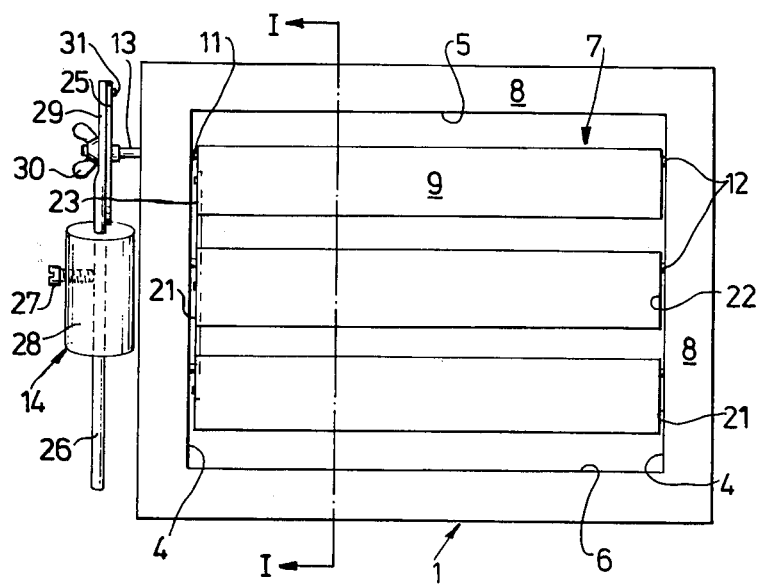
Figure 3:
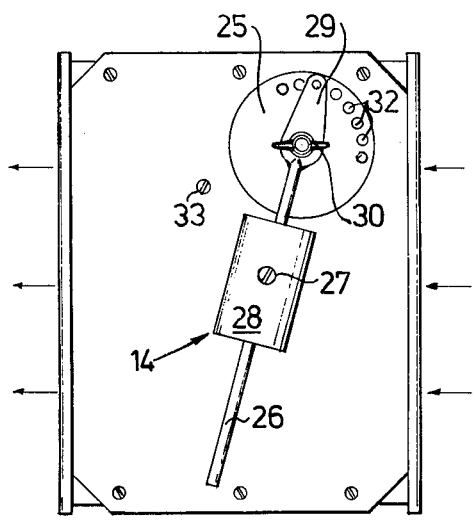
Figure 4:
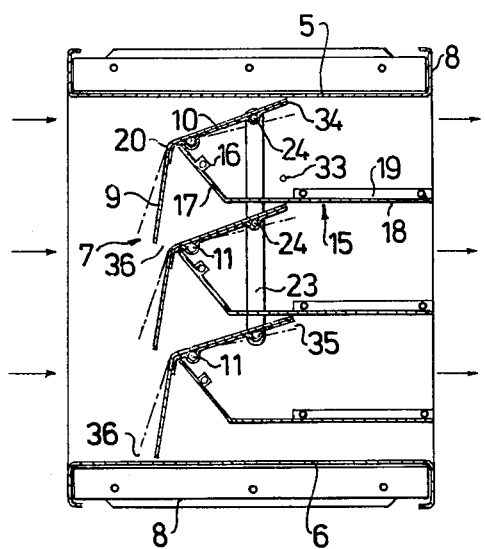

In FIG. 1 on the drawings there is shown a flow picture at a longitudinal section (parallel to the flow) through the housing of the apparatus on the line 1—1 of FIG. 2;

In FIG. 2 there is shown a vertical projection of the apparatus seen in the direction towards the fluid inlet of the housing (i.e., the housing seen from the left in FIG. 1);

In FIG. 3 there is shown in vertical projection a side view of the housing (the housing seen from the left in FIG. 2); and In FIG. 4 there is shown a sectional view corresponding to FIG. 1 of the apparatus when the damper blades are swung into the maximally constricting position.

On the appended drawings there is shown an embodiment of the appratus provided with three synchronously acting damper blades. The regulator housing generally designated 1 is made as a parallel epipedic box, one end of which accommodates the fluid inlet 2 of the apparatus, the opposing end accommodating the fluid outlet 3. From the inlet 2 to the outlet 3 extends the throughput or throughflow passage of the apparatus which passage at the sides is defined by the side walls 4 of the housing, and upwardly and downwardly by the top 5 and bottom 6 of the housing. The three pivotable damper blades arranged transversely in the throughput passage of the apparatus are made in the same way and generally designated 7 on the drawing. At both the inlet and outlet sides of the apparatus the housing 1 has edge flanges 8 going round the edges. The longitudinal edges at the top 5 of the housing and its bottom 6 also have similar edge flanges 8. As may be seen from FIG. 2 the throughput passage of the housing is a rectangle in cross section.

Each damper element has the shape of a damper blade 7 which is angular in cross section, as may be seen from FIGS. 1 and 4. The damper blade comprises a substantially planar forward portion 9, and a substantially planar rear portion 10 connected thereto. The angle (see FIG. 1) between the blade portions 9 and 10 is about 120° in the embodiment shown. Each damper blade 7 is attached to, and carried by a damper shaft 11 extending transversely through the passage and pivotally mounted in the housing, the opposing ends of the shaft forming journals or pivots 12 in holes in the side walls 4 of the housing. The journal 12 on the shaft of the uppermost damper blade 7 continues outside the housing 1 with an extension forming the counterweight neck 13 of the apparatus. This counterweight neck carries the adjustable mass body system of the apparatus, generally designated 14 in FIGS. 2 and 3.

Both the housing 1 and damper blades 7 can suitably be manufactured from sheet material. The damper blade 7 can hereby be suitably made by spot welding two plates together between which the shafts 11 have been placed before welding the plates together. As is clearest from FIG. 1, each damper blade 7 is coordinated with a baffle plate 15 mounted in the housing transverse to the throughput passage. The three commonly parallel baffles 15 extend sideways between the parallel side walls 4 of the passage. Each baffle plate 15 is attached to either side wall by means of a screw through a lug 16, bent up from the forward inclined plate portion 17 and by two or more screws through an edge flange 19, bent up from the horizontally disposed rear plate portion 18 of the plate. The baffle plate 15 for each damper blade extends from a point immediately in front of and adjacent the carrying shaft 11 of the damper blade downstream to a place in the region of the housing outlet 3. For each damper blade 7 the shaft 11 is situated immediately behind the folding line 20 of the blade. As is apparent from FIG. 2 the damper blades 7 are so arranged in the throughput passage of the housing so that there is a certain working gap 21 between the side edges 22 of the blades and the side walls 4. In the working gap 21 at one side of the blades 7, there is arranged (as seen in FIG. 2) a vertically directed connecting link 23, wherewith the rear blade portions 10 of the damper blades 7 are connected together for synchronous movement of the damper blades. The connecting link 23 is coupled to the blade portions 10 via shafts or pins attached to these portions, the free ends of the former being accommodated in through-holes in the connecting link, and can consist of rods welded to the underside of the blade portions 10. When the blade portions 10 consist of two plates joined one on top of the other, the shaft ends accommodated in the connecting link can be the free ends of reinforcing bars or wires placed between the plates. The pivots thus formed between the damper blades 7 and the connecting link 23 are generally designated 24.

The mass body system mentioned above, generally designated 14 on the drawings and which is carried by the counterweight neck 13 comprises three main parts, viz. an adjusting plate 25 rigidly attached to the shaft 13, a counterweight arm 26 projecting radially and substantially at right-angles to the shaft 13, and a counterweight 28 fixedly attachable to the arm in different positions by means of a screw 27. The arm 26 is attached to a substantially flat head 29 provided with a hole for accommodating the outer threaded end of the counterweight neck 13. The head 29 and thereby also the arm 26 is kept on the threaded outer end by means of a wing nut 30. On the side of the head 29 facing the housing 1 there is a projecting pin 31 fitting the adjusting holes 32 provided along the circumference of the plate 25. When the arm 26 is to be adjusted to a certain desired radial position relative to the shaft 11, this is done by undoing the wing nut 30 to allow the head 29 to move away from the side wall and sufficiently to allow the pin 31 attached thereto to be drawn out of the hole 32 in which it was engaging and be taken to a new hole 32 representing the new desired position. The wing nut is thereafter retightened. Adjustment of the mass body system 14 is then finished off by loosening the screw 27 so that the counterweight 28 can be moved to a desired position on the shaft 26, whereafter the screw 27 is once again tightened to fix the counterweight 28 in its new position.

The position of minimum constriction for the damping system comprising the three damper blades 27 is determined by the pin or boss 33 (see FIGS. 1 and 3) which defines the most downwardly swung position for the rear blade portion 10 of the upper blade 7. The second extreme position of the apparatus, corresponding to the maximum flow damping effect of the damper blades (and thereby the constricting effect of the apparatus) is apparent from FIG. 4. In this case the effect of fluid flow pressure on the damper blades 7 has caused these to swing so that the rear blade portion 10 of the upper blade 7 has its rear edge 34 brought into contact with the top 5 of the flow passage. In FIG. 4 there is shown with dashed contour lines the position for the damper blade 7 corresponding to a regulated equilibrium between the described extreme positions according to FIGS. 1 and 4. In said damper blade position indicated by dashed contour lines, the fluid flows through the apparatus via the gaps 35 between the rear edge of the rear blade portions 10 of the damper blades and respectively the ceiling and undersides of the rearward portions 18 of the baffle plates 15, and through the louvre-like openings 36 between the front edges of the forward blade portions 9 and the upper side of the damper blade lying beneath or (for the lowest damper blade) the bottom 6 of the flow passage.

As a result of the special design of the damper blades 7 and the presence of the mass body system 14, there occurs for any mass flow through the apparatus (within its functional range) a position of equilibrium determined by the torque equilibrium about the damper shafts 11 as a result of the fluid forces which the mass flow in question generates on the respective forward and rear blade portions of each blade, and the torque generated by the mass body system 14 and effecting the respective damper shaft (directly or indirectly). The latter torque comes directly via the counter-weight neck 13 for the upper damper blade 7 and indirectly via the communicating link 23 for the remaining damper blades lying beneath.

The operation of the apparatus functioning as a flow regulator will now be briefly described.

It is assumed that the apparatus is coupled into a fluid flow path, such that the fluid inlet of the apparatus is upstream and its outlet downstream to the direction of flow. The mass flow in the passage comes first into contact with the forward blade portions 9 of the damper blades 7 when it enters through the inlet of the apparatus, and thereby attempts to swing the damper blades 7, united by the connecting link 23, in an anti-clockwise direction (according to FIG. 1) so that the rear end portions 10 of the blades are swung up respectively towards the ceiling and the underside of the rear baffle plate portions 18. As a result of the angular shape in cross section of the damper blades, the flow will meet the rear blade portions 10 now swung up above the horizontal plane, after having passed the forward plate portions 9, and apply a force to the portions 10 striving to swing the damper blades in the opposite direction (clockwise) to the direction in which the effect of the flow on the portions 9 attempts to swing them. A position of equilibrium will hereby arise, in which the flow forces on the portions 9 and 10 will be counterbalanced by the effect of the force of the mass body system 14 on the damper blades. The gaps 35 arising at the rear edges of the rear blade portions 10 of the damper blades on equilibrium adjustment will hereby on the whole determine the flow which is able to pass through the apparatus acting as a regulator. The opening 36 at the front edge of the front blade portion 9 of the lowest damper blade 7 also affects said total flow through the apparatus to a certain lesser extent. If a larger mass flow attempts to pass through the throughput passage of the apparatus after a state of equilibrium has now arisen therein, it will be prevented by the increased flow force acting on the front portions 9 of the damper blades 7 so that a gap 35, less than that in the previous state of equilibrium, now arises. In spite of the total throughput cross-sectional area having thus diminished, an unaltered flow will be able to pass through the apparatus since the amount of fluid flowing into the inlet of the apparatus per unit of cross sectional area and time unit is greater than before. A new state of equilibrium thus arises as a result of the effect of the new flow on the portions 9 and 10 of the damper blades. If a less flow per unit of cross-sectional area is supplied to the apparatus instead, a reversed adjustment of the damper blades takes place, whereat the size of the gaps 35 increases.

The size of the flow which can pass through the troughput passage of the apparatus and the pressure of the fluid in question is determined by the adjustable mass body system 14. If it is desirable to increase the flow through the apparatus the counterweight 28 is moved further outward on the arm 26 which means that greater flow forces are required to swing the damper blades 7 into a position of equlibrium, which otherwise expressed means that the regulator adjustment towards increased constriction is counteracted. There is a further opportunity of altering the regulating action of the apparatus, this being provided by engaging the pin 31 of the head 29 of the mass body system 14 in a hole 32 other than the one already used. The last-mentioned possibility of altering the radial direction of the arm 26 in relation to the counterweight neck 33 (and thereby in relation to the damper blades) is also important, since this structural design of the mass body system enables mounting the apparatus so that a state of equilibrium can be set independent of whether the flow path in which the apparatus is incorporated is horizontal, vertical or in some intermediate position between both these extreme directions.

It should finally be noted that the embodiment of the invention described above and shown on the drawings only represents one of a plurality of embodiments lying within the scope of the invention. The scope of the invention is thus not apparent from the description but is defined in the following patent claims.

What I claim is:

1. An apparatus intended for placing in the path of a fluid flow, e.g. an airstream to maintain a substantially constant mass flow in the flow path downstream of the apparatus independent of pressure alterations in the flow path upstream of the apparatus, said apparatus comprising a regulator housing (1) with a fluid inlet (2) to which the flow path upstream of the apparatus is connected, a fluid outlet (3) to which the flow path downstream of the apparatus is connected and a plurality of throughput passages in the housing, extending from the inlet to the outlet, in said passage, there being arranged a plurality of movable damper elements (7) operable from outside the housing, the adjustment of which causes alteration of the throughput cross-sectional area of the passages, each damper element comprising a damper blade (7), angular in cross section, and having a substantially planar forward blade portion (9) and a substantially planar rear blade portion (10) connected thereto which forms an obtuse angle with the forward blade portion, each said damper blade being carried by and attached to a damper shaft (11) pivotally mounted in the housing and extending transversely through the passage, whereby the throughput cross-sectional area is determined primarily by the size of a gap (35) between each rear blade portion (10) and a first, fixed wall portion in an adjacent passage, and secondarily by an intermediate space (36) between each forward blade portion (9) and a second fixed or movable wall portion in an adjacent passage and that the damper blade position in the passages is determined by the torque equilibrium about the damper shafts resulting from the fluid forces generated by the fluid mass flow on the forward and rear blade portions, and a torque with which the damper shafts are affected by an adjustable mass body system (14) carried by and acting on a counterweight neck (13) interconnected with the damper shafts and projecting outwardly from the outside of the housing, a baffle plate (15) mounted transverse to the passage and attached to the housing for each damper blade (7), the baffle plate extending between the parallel side walls (4) of the passage, and extending with a planar, forward plate portion (17) in the flow direction from the region of the damper blade shaft (11) down to a line parallel with this shaft beneath and downstream of the shaft, from which line the plate continues outwards with a planar rear plate portion (18) parallel to the top (5) and bottom (6) walls of the passage towards the fluid outlet (3).

2. An apparatus as claimed in claim 1, characterized in that the regulator housing (1) has the shape of a box-like structure with a throughput passage having a substantially rectangular or quadratic outer configuration in cross section, the forward end of the housing accommodating the fluid inlet (2) and its rear end accommodating the fluid outlet (3) and that in the throughput passage are arranged at least two identically shaped damper blades (7) attached to separate but parallel shafts, the rear blade portions of the damper blades being connected together by means of a connecting link (23) providing synchronous movement of the damper blades.

3. An apparatus as claimed in claim 1, characterized in that there are arranged at least three identically shaped damper blades (7) in the throughput passage, the blades (7) being connected together for synchronous movement by means of a common connecting link (23), the gap (35) of the upper damper blade being limited by the upper wall (5) of the passage and the rear blade portion (10) of the blade, and that the gaps (35) of the remaining damper blades (lying beneath) are defined by the rear blade portion (10) of the respective damper blade, and the undersides of the rear plate portion (18) of the damper blade baffle plate (15) lying above, and that the opening (36) of the lowest damper blade is defined by the lower wall (6) of the passage and the front edge of the blade portion (9) while the remaining openings of the damper blades (lying above) are defined by the damper blade lying below and the front edge of the forward plate portion of the blade.

4. An apparatus as claimed in claim 1, characterized in that the angle between the forward and rear blade portions (9 and 10, respectively) of each damper blade (7) is within the range of 100°-140° and preferably amounts to about 120°, and that the shaft (11) of each damper blade is situated adjacent the forward part of the rear blade portion (10) of the blade.

5. An apparatus as claimed in claim 1, characterized in that the mass body system (14) comprises an arm (26) projecting transversely to the counterweight neck (13), which consists of an extension of the outer end of the damper shaft to one of the damper blades, said arm being lockable in a desired radial direction relative to the counterweight neck, and a counterweigt body (28) lockable on the arm in different positions.

6. An apparatus as claimed in claim 1, characterized in that the range of movement of each damper blade (7) is limited at one extremity by stop means (33) attached to the housing, against which stop means one of the blades is adapted to engage with the underside of its rear blade portion (10), and the other extremity by the abutment between the upper side of the rear blade portion (10) of a blade and the fixed wall portion (5 or 15) lying above in the passage.

* * * * *